United States Patent [19]

Sigworth, Jr.

[11] 4,409,959

[45] Oct. 18, 1983

[54] SOLAR ENERGY WATER PREHEAT SYSTEM

[75] Inventor: Harry W. Sigworth, Jr., Orinda, Calif.

[73] Assignee: Chevron Research Company, San Francisco, Calif.

[21] Appl. No.: 259,294

[22] Filed: Apr. 30, 1981

[51] Int. Cl.³ .............................................. F24J 3/02
[52] U.S. Cl. .................................. 126/422; 126/434; 165/40; 137/468; 137/533.11; 137/564; 236/93 R
[58] Field of Search ................ 126/434, 422, 419; 137/528, 529, 532, 533, 533.11, 533.13, 533.15, 533.17, 533.19, 533.21, 533.23, 533.25, 533.27, 533.29, 533.31, 534, 468, 564; 236/59, 93 R, 99 J, 101 R; 251/11, 338; 165/40

[56] References Cited

U.S. PATENT DOCUMENTS 1,242,511 10/1917 Bailey ................................. 126/434
3,610,275 10/1971 Determan ...................... 137/533.11
4,137,964 2/1979 Buckley ................................. 165/1

FOREIGN PATENT DOCUMENTS 1242310 4/1960 France .

Primary Examiner—William R. Cline
Assistant Examiner—John K. Ford
Attorney, Agent, or Firm—D. A. Newell; E. J. Keeling

[57] ABSTRACT

A passive thermosiphon loop of circulating heat transport liquid transfers heat from an inclined absorber to a heat exchanger in thermal contact with a second fluid. Reverse thermosiphoning under normal conditions is prevented by a ball type check valve. Due to differences in the thermal expansion between the valve ball and the transport liquid, the valve will, however, permit reverse thermosiphoning at high temperatures.

4 Claims, 2 Drawing Figures

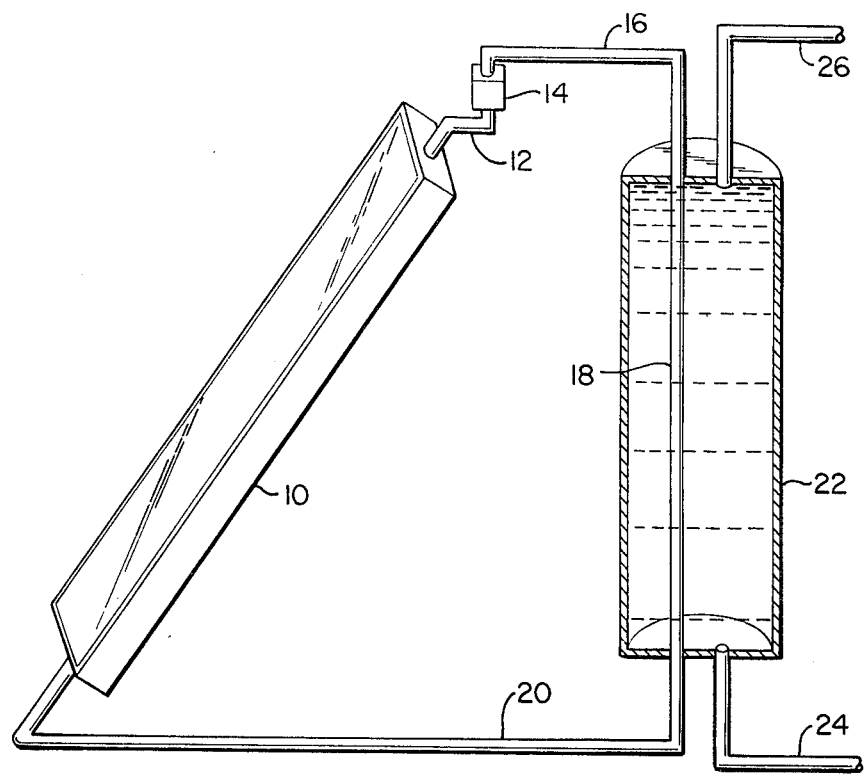
FIG._1.
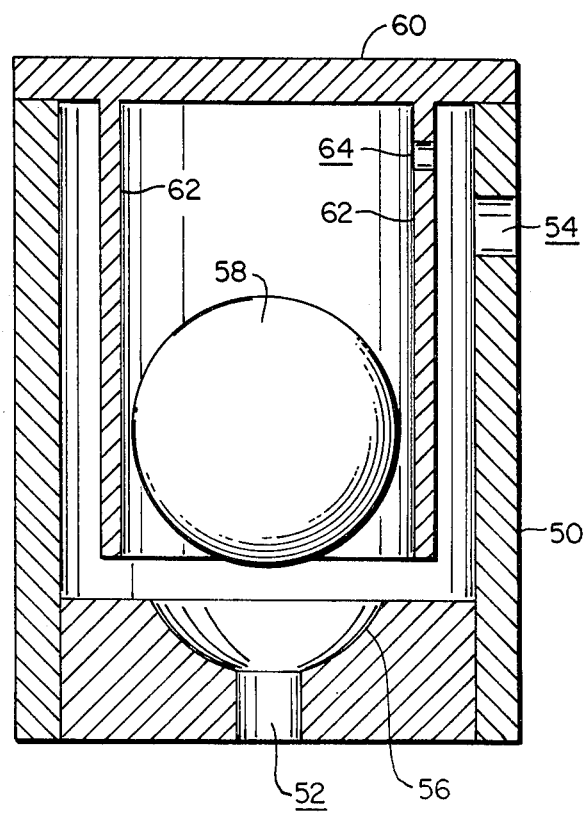
FIG._2.

SOLAR ENERGY WATER PREHEAT SYSTEM

BACKGROUND OF THE INVENTION

1. Field of the Invention

The present invention finds principal application within the field of passive solar energy systems. More particularly, the invention relates to a thermosiphon solar energy system which is suitable for preheating water.

2. Prior Art

With the dwindling supplies of fossil fuel and the accompanying increasing energy cost, extensive research efforts are being focused to harness solar radiation on a practical and economical scale. One type of device which shows promise in the field is the thermosiphon system, described in U.S. Pat. Nos. 4,137,964 and 4,050,508, issued to Bruce Shawn Buckley. As disclosed in the above references, a "thermic diode" panel is used to collect and store the sun's radiant energy. The panel typically comprises a shallow, rectangular box that is effectively divided into two chambers by a slab of insulation. The chambers are filled with a liquid, such as water, and are in open communication with each other at the bottom of the panel via a passage through the insulation, and in open communication at the top through an "oil valve" control box, normally located outside the panel proper.

Solar radiation, incident on the outer panel face, will heat the water in the collector chamber. As the water is heated, it expands and passes upwardly through the oil valve and into the cooler storage chamber, setting up a thermosiphon loop. Cooler water from the storage chamber, in turn, passes through the insulation passage at the bottom of the panel to the warmer collector chamber.

If such a panel is used during the day to collect solar energy and store the heat for nighttime use, reverse thermosiphoning must be avoided to prevent energy loss. The oil valve achieves this objective and, in addition, increases the sensitivity of the thermosiphoning process to small temperature differences between the chambers. However, loss of the oil to solution presents certain problems, and the use of a demand water exchanger, as shown in U.S. Pat. No. 4,050,508, requires a rather large heat exchange surface area to be effective, which in turn increases the overall unit cost.

It is, therefore, an objective of the present invention to provide an inexpensive but reliable alternative to the oil valve and to provide a hot water preheater system incorporating the alternative valve without the use of a large heat exchange surface area.

SUMMARY OF THE INVENTION

The present invention relates to a solar energy system which is particularly suitable for preheating hot water. The system is basically comprised of a passive thermosiphon loop in which heat is transferred by a circulating transport liquid from an absorber exposed to the sun's radiation to a heat exchanger in thermal contact with a second fluid. The absorber is inclined to the horizontal and has flow passages therethrough for the circulation of the heat transport liquid at a positive pressure of normally less than 10 psig (1.68 atmospheres). A conduit loop for the removal of hot transport liquid from the top of the absorber and the return of cool transport liquid to the bottom of the absorber is provided which has a ball check valve disposed therein. The movable ball member in said valve preferably has a density slightly greater than the fluid at or below a specified normal operating temperature and a density less than the fluid above the specified normal operating temperature. The valve member will thus sealingly engage a valve seat to prevent the downward flow of fluid if the operating temperature is at or below the specified normal temperature, but will disengage from the valve seat to permit the upward flow of fluid under normal flow conditions. The valve member will also disengage from the valve seat to permit reverse thermosiphoning if the operating temperature is above the specified normal.

Means are provided for exchanging thermal energy from the hot transport liquid in the conduit loop to a higher pressure, cooler fluid. This means is preferably comprised of a tube type heat exchanger located between the valve and the return inlet of the conduit to the absorber. The tube in said exchanger is preferably provided by the conduit loop and has a surrounding shell of sufficient strength to withstand the pressure of the second fluid, which in most cases, will be tap water.

BRIEF DESCRIPTION OF THE DRAWINGS

FIG. 1 illustrates a preferred embobiment of the present invention which is suitable for the preheating of tap water to a hot water heater.

FIG. 2 illustrates a preferred embodiment of a valve made in accordance with the present invention.

DETAILED DESCRIPTION OF THE PREFERRED EMBODIMENT

Referring to the drawings, and to FIG. 1 in particular, there is shown a preferred embodiment of the present invention.

The system is basically comprised of a passive thermosiphon loop of a circulating heat transfer liquid through which heat is transferred from an absorber exposed to the sun's radiation to a heat exchanger in thermal contact with a second fluid. Under normal operating conditions, flow is maintained in a clockwise circulation pattern with respect to the thermosiphon loop shown in FIG. 1. The flow of heat transport liquid is generally from the top of absorber 10 through line 12 to valve 14, from valve 14 through line 16 to exchange tubing 18, and from tubing 18 back to the absorber via line 20. A second fluid is heated in housing 22 by exchange with the heat transfer liquid as the latter passes through tubing 18. In this way, the second fluid in housing 22 is heated by the energy picked up by the heat transfer liquid in absorber 10.

The absorber 10 may be manufactured from a number of materials. Metal is preferred for use in nonfreezing conditions. Where freezing may be encountered, either metal (with a nonfreezing liquid in the absorber loop) or a synthetic rubber (with tap water in the absorber loop) are the preferred materials. EPDM is a particularly preferred, low gravity synthetic rubber, which is commercially formulated by a number of manufacturers. Properly formulated EPDM is extremely resistant to degradation by sunlight, is inexpensive, and can withstand temperatures as high as 170° C. without threat of thermal failure. In addition, absorbers can be fabricated from EPDM which have sufficient stretch capability to withstand the forces exerted by the expansion of freezing water.

Referring now to FIG. 2 of the drawings, there is shown a cross-section of a valve constructed in accordance with the teachings of this invention. As shown therein, there is provided a housing 50 having lower and upper ports 52 and 54, respectively, for the passage of liquid therethrough. There is also provided a spherically shaped valve seat 56 having an aperture through which all fluid passing through the valve must flow. Although the valve seat is shown as a separate part in the figure, it is within the spirit and scope of this invention to manufacture the seat directly from the housing walls as a unitary body. If the valve seat is separately fabricated, as indicated in the drawing, it may be secured to the inner housing walls in any conventional manner. A spherical valve member 58 is movably disposed within the housing above valve seat 56.

While the shapes of the valve seat and mating valve member are preferably spherical, other shapes such as circular seats with conical valve members, square seats with inverted pyramidal valve members, frusto-conical seats with spherical valve members, and the like, may also be used.

Valve member 58 will preferably have a density greater than, but very close to the density of the liquid flowing through the valve at its normal operating temperature to minimize the pressure drop and increase the valve sensitivity. Thus, if water is used as a circulating heat transport fluid and the system is installed for preheating water to a hot water heater, the water will normally be heated to a temperature in the range of 70° F. (21.2° C.) to 180° F. (82.2° C.) before passing through the valve. At these temperatures, the density of pure water ranges from 60.5 lb/ft$^3$ (0.97 g/cm$^3$) to 62.3 lb/ft$^3$ (0.998 g/cm$^3$) and the density of the valve member will preferably be no greater than 105% and more preferably, no greater than 101% of the water density.

Under normal operating conditions, the heated water from absorber 10 will pass upwardly through line 12 (see FIG. 1) into the lower port 52 (see FIG. 2) of the valve. The upward flow and pressure forces will displace valve member 58 from seat 56, thereby permitting the water to flow around the member and out through port 54. However, if the water is warmer in tubing 18 than in absorber 10, the water will tend to flow from the tubing 18 through line 16 to absorber 10. The force of gravity, in combination with fluid forces, under these conditions, will cause member 58 to lodge in valve seat 56 thereby preventing reverse thermosiphon flow.

Although no special materials of construction are required for the valve housing and seat, apart from those dictated by standard engineering considerations, the valve member materials must exhibit certain characteristics. In addition to the density requirements set forth above, the valve member must be designed so that at temperatures above the desired operating temperature, the member will become buoyant in the circulating fluid.

In general, materials may be selected for the valve member which have a density greater than water at the operating temperature and which thermally expand at rates faster than water to become buoyant at the higher temperatures. One such valve member construction material which meets this criteria is low density nylon. It should also be noted that the material selected need not necessarily be homogeneous, but may be comprised of two or more materials such as plastic with metal weights embedded therein, or hollow ground thermometer glass balls with weighted resin centers.

Cap 60 conventionally seals the top of housing 50 and provides a means of access to the interior thereof. Extending from the bottom of cap 60 is a guide cylinder 62 having an inner diameter greater than the diameter of spherical valve member 58. The lower end of guide member 62 preferably extends at least below the center of seated member 58. Whenever member 58 is unseated due to its buoyancy at high temperatures or due to the upward flow of fluid through port 52, the spherical member will be confined to travel within the interior regions of guide cylinder 62, thereby preventing obstruction of port 54 and aiding in reseating of the member under appropriate conditions. Relief aperture 64, provided near the top of cylinder 62, permits fluid to escape from the interior of the guide cylinder if the valve member is moving upwardly and permits fluid to enter the cylinder if the valve member is moving downwardly. Although the size of the aperture is not critical, a one-eighth inch (0.317 cm) diameter hole has been found satisfactory.

With a guide means, such as cylinder 62, the valve may be inclined as much as 70° from the vertical axis, and the valve member will still seat properly under flow rates typically encountered in thermosiphon systems.

An alternate guide means involves the use of radial fins which form a channel for the ball to roll in. These fins extend radially inward from the inside of the outer shell, and serve to cradle the ball, yet allow fluid to flow around the ball.

Hot transport liquid effluent from valve 14 passes through piping 16 into tubing 18 encased within housing 22. Housing 22 will also have inlet and outlet pipes 24 and 26, respectively, for the introduction and removal of the second fluid therefrom. In a preferred installation for the preheating of water to a hot water heater, the inlet second fluid will comprise cold tap water at line pressure and the thermosiphon loop of circulating heat transport liquid will normally be maintained at a positive static pressure of less than 10 psig (1.68 atmospheres). Preferably, the housing 22 is sized sufficiently large to provide intermediate demand capacity for the system equal to the hot water heater capacity. This permits the tubing 18 to be of minimum area since heat exchange from the collector to the second fluid will be conducted over a longer period of time.

I claim:

1. A solar energy system for heating fluids, which comprises:
    an absorber inclined to the horizontal, having flow passages therethrough for the thermosiphoning circulation of heat transport liquid;
    a conduit loop for the removal of hot transport liquid from the top of the absorber and the return of cool transport liquid to the bottom of the absorber;
    a valve disposed in said conduit loop having a housing with a lower inlet port for the introduction of transport liquid passing to the valve from said absorber and an upper outlet port for the transport liquid effluent passing through said valve; a valve seat interposed in said housing between said ports; a valve member movably disposed in said housing above the valve seat, which has a density greater than the heat transport liquid at or below a specified normal operating temperature, and a density less than the heat transport liquid above the specified normal operating temperature, which valve member will sealingly engage the valve seat to prevent the downward flow of heat transport liquid if the operating temperature is at or below the specified normal operating temperature, but which will disengage from the valve seat to permit the upward flow of fluid, and which will also disengage from the valve seat to permit the downward flow of fluid if the operating temperature is above the specified normal operating temperature; and means for exchanging thermal energy from the hot transport liquid in the conduit loop, between said valve and the return inlet of the conduit to the absorber, to a cooler fluid.

2. A solar energy system as recited in claim 1 wherein said means for exchanging thermal energy comprises a tube formed from a portion of the conduit loop encased by a housing having fluid passages therethrough for the flow of said cooler fluid in thermal contact with said portion of the conduit loop.

3. A solar energy system as recited in claim 2 wherein said cooler fluid is tap water at line pressure which is to be preheated before passing to a hot water heater.

4. A solar energy system for preheating tap water as recited in claim 3 wherein said valve includes guide means for receiving the unseated valve member.

* * * * *